United States Patent [19]
Acks et al.

[11] 3,805,157
[45] Apr. 16, 1974

[54] AMP-HOUR METER
[75] Inventors: Robert S. Acks, San Diego; Joseph C. Quigley, Oxnerd, both of Calif.
[73] Assignee: The United States of America as represented by the Secretary of the Navy, Washington, D.C.
[22] Filed: Dec. 18, 1972
[21] Appl. No.: 316,190

[52] U.S. Cl.............. 324/141, 324/29.5, 324/76 A
[51] Int. Cl. .................... G01r 7/00, G01n 27/42
[58] Field of Search........ 324/76 R, 76 A, 141, 142, 324/29.5, 181, 182; 325/152

[56] References Cited
UNITED STATES PATENTS
2,855,993   10/1958   Rahmez ..................... 324/181 UX
3,745,381    7/1973   Kelly ................................. 307/265
3,727,074    4/1973   Keller et al. ...................... 324/76 A
2,287,862    6/1942   Brian ................................. 325/152

*Primary Examiner*—Alfred E. Smith
*Attorney, Agent, or Firm*—Richard S. Sciascia; Ervin F. Johnston; Thomas Glenn Keough

[57] ABSTRACT

A submersible having a bank of storage batteries for power is provided with a circuit giving crewmen a real-time indication of power used or power remaining in the batteries. A sensor element interposed in series with the load created by the submersible's machinery bleeds off a small sample of the load current which is proportional to the power drain of the machinery. An integrator circuit coupled to a unijunction transistor functions as a relaxation oscillator to generate pulses at a rate proportional to the magnitude of the load current and to pass them to a circuit for producing counter pulses. Counter pulses are coupled to a digital read-out for providing a visual indication of power used or power remaining in the batteries and also are fed-back to the integrator circuit to repeatedly reset it during the integration sequence. Increased reliability is ensured by the provision of a biasing-circuitry arrangement which is "on" only during the period when load current is being drawn from the bank of storage batteries.

1 Claim, 2 Drawing Figures

AMP-HOUR METER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Historically, submersibles have relied upon banks of storage batteries for a source of power during undersea ventures and wattmeter of voltmeter-ammeter combinations have provided a read-out of the power consumed. However, these instruments tend to be unreliable in the interior of a submersible where excessive humidity and the corrosive effects of sea water must be tolerated. A further limitation became apparent in that the analog read-outs presented by the conventional meters were subject to misinterpretation and were susceptible to damage from ambient vibration and shock. One noteworthy attempt to remedy the defects of the analog devices was the monitor disclosed in the U.S. Pat. No. 3,582,923. While this monitor gives an indication of the charge being fed to a bank of batteries, it does not provide a digital read-out of the amount of power remaining in the batteries. The long term reliability of the monitor is doubtful since there is no biasing circuit having an "on" duty cycle only when power is being transferred. There is a continuing need in the state-of-the-art for a reliable device giving a digital read-out of the power remaining in a submersible bank of storage batteries irrespective of the rate at which the power is being consumed.

SUMMARY OF THE INVENTION

An apparatus for indicating the power drawn by a submersible from its on-board batteries includes a means for providing a signal proportional to the load current flowing from the batteries to the submersible's electrical machinery. An integrator circuit provides integrated signals at a rate proportional to the magnitude of the proportional signal. When each of the integrated signals reach a predetermined threshold, following circuitry produces a series of responsive trigger pulses which, in turn, generate corresponding counter pulses. These counter pulses are fed to a digital read-out which provides a visual indication of the accumulated counter pulses and, hence, the power used. The counter pulses also are fed to a circuit for resetting the integrator back to zero. An actuating circuit providing biasing power for the integrator circuit is operatively coupled to the integrator circuit only during the time when current is flowing from the bank of storage batteries to ensure a responsive monitoring of the power drain from the batteries and to reduce the hazards confronting the crew of a submersible.

The prime object of the invention is to provide a means for monitoring the power drain on a submersible's bank of storage batteries.

Yet another object is to provide an amp-hour meter having its integrator circuit actuated only during the time when power is being drawn from the batteries.

Still another object is to provide a circuit having a single point of adjustment for providing indications of the power drain on a bank of storage batteries.

A further object is to provide a circuit of reduced complexity and inherently greater reliability.

These and other objects of the invention will become more readily apparent from the ensuing specification when taken with the drawings.

DESCRIPTION OF THE PREFERRED EMBODIMENT

Figure 1:
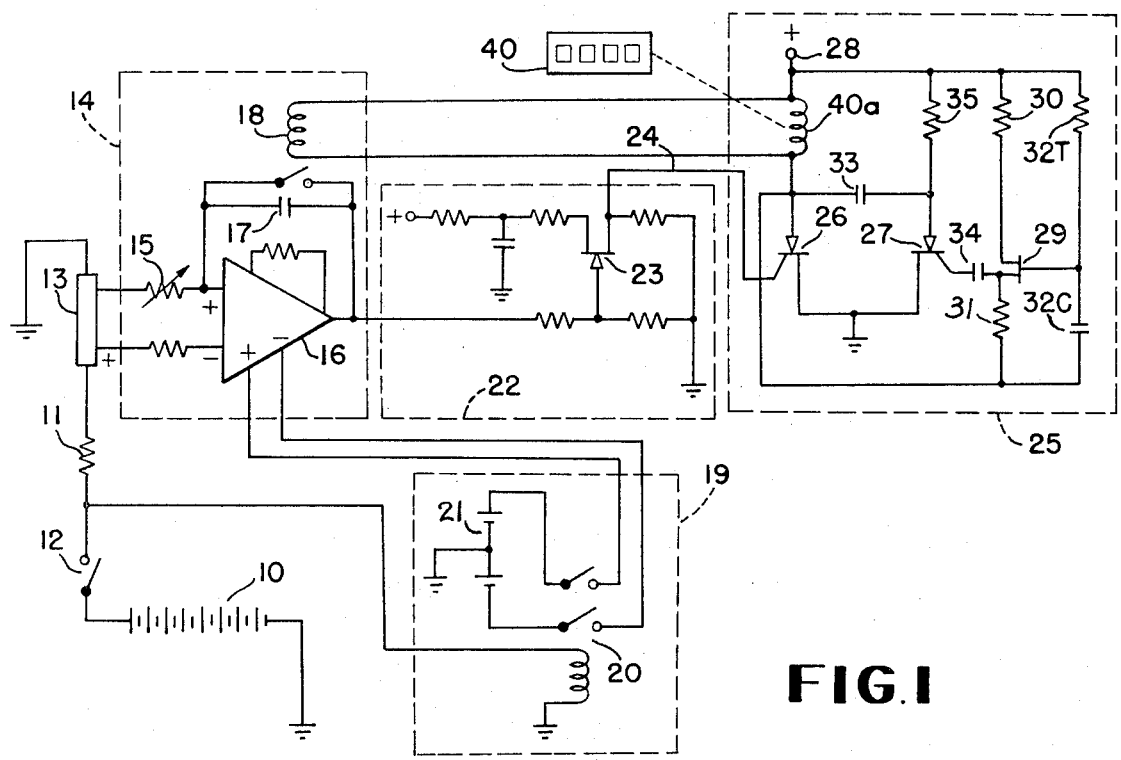
FIG. 1 is the schematical representation of a preferred form of the invention.

Looking now to FIG. 1, a bank of storage batteries 10 of the type employed in small, self-contained submersibles is connected to a load II via a switch 12. For the purpose of explanation only a switch 12 is shown serially interconnecting the batteries to the load and it is to be understood that the schematical representations of the load and switch embrace the propulsive machinery, internal lighting, pumps etc. and "off" – "on" devices, rheostats, and other actuators respectively, as they are operatively interrelated within the submersible.

A calibrated shunt resistor 13 is serially interposed in the load-battery circuit and a potential is developed across it which is directly proportional to the load current flowing from the batteries to ground. Typically, the magnitude of the proportional signal reaches 100 mv at a maximum load current and of course, when there is no load current flowing, the signal across the shunt resistor is zero. The proportional signal is fed to an integrator circuit 14 which includes, as principal components, a serially disposed variable resister 15, an operational amplifier 16, a feed-back capacitor 17, and a reset relay 18. The variable resistor is included to permit a calibration of the device by changing the integrating time of the integrator circuit. By increasing the variable resistor's impedance the integration time of circuit 14 is increased and hence the rate of counter pulses is proportionally decreased as will be explained below. This single variable resistor permits an external recalibration of the device without having to disturb other elements within the amp-hour meter. This feature gives this invention a capability for monitoring a variety of batteries by simply adjusting the variable resistor.

The specific operational amplifier employed in the instant application was a N5741 manufactured by the Signetics Corporation of Sunnyvale, California. The "D" package of this operational amplifier was connected to feedback capacitor 17 and reset relay 18 as well as variable resistor 15 in accordance with the general theory disclosed upon pages 44 and 45 of the publication, *Generalized Instrumentation for Research and Teaching* by Charles F. Morrison, Jr. Integrator circuits are in widespread use, however, a simple discussion regarding their mode of operation is felt to be in order to enable a thorough understanding of this invention. As the proportional signal is charged on feedback capacitor 17 at a rate determined by the values of the variable resistor and the feedback capacitor, a predetermined maximum allowable voltage is reached. Discharge occurs by closing the relay.

At this point elaboration regarding a novel feature of the invention, actuator circuit 19, is felt to be in order. A relay 20 interconnects biasing batteries 21 to operation amplifier 16 only when current is flowing through load 11 after switch 12 has been closed. After switch 12 is closed, a conductive path is created between bank of storage batteries 10 to ground via relay 20. Consequently the contacts of relay 20 are closed and biasing batteries 21 are interconnected to operational amplifier 16 only when there is load current flowing and a resultant proportional signal developed across shunt resistor 13. When switch 12 is opened and no load current flows through the shunt resistor, the contacts of relay 20 are opened and the biasing batteries are disconnected from the operational amplifier. Thus, prolonged, reliable operation of the integrating circuit is ensured by the disconnection of the biasing batteries during the off-duty cycle and their responsive interconnection during the on-duty cycle.

In the present application, the predetermined maximum allowable voltage referred to above is sufficient to cause a breakdown of a sensing circuit 22. The breakdown occurs across a unijunction transistor 23 which responds to the magnitude of the maximum allowable signal to provide a trigger pulse at an output point 24. The sensing circuit is more popularly known as a basic relaxation oscillator having components which function in a manner as disclosed in the seventh edition of the *General Electric Transistor Manual*, pages 312 et seq.

After the breakdown potential of unijunction transistor 23 in circuit 22 has been reached, a trigger pulse is fed to counter pulse generating circuit 25 which functions to provide not only a counter pulse for a four-digit counter 40 but also generates a reset pulse for integrator circuit 14.

Counter pulse generating circuit includes a pair of silicon controlled rectifiers (SCR) 26 and 27 connected substantially in-parallel between a source of potential 28 and ground. The potential is a discrete battery or optionally is tapped from batteries 10. The SCR 26 has its anode connected in-series with sensory coil 40a of a four-digit counter 40. The counter is any one of a variety of commercially available models which are responsive to pulsed signals for providing a visual indication of the accumulated pulses received. Noting FIG. 1 of the drawings, the sensory coil is also electrically coupled to reset relay 18 for passing a reset pulse to the relay in a manner to be elaborated on below.

The gate of SCR 26 is coupled to receive the triggering pulse from output point 24 of sensing circuit 22. Upon the receipt of a triggering pulse from the sensing circuit, SCR 26 is turned "on," creating a counter pulse for the four-digit counter as well as a resetting pulse for reset relay 18.

The duration of the counter pulse is determined by the electronic cooperation between SCR 27 and a relaxation oscillator circuit formed of a unijunction transistor 29, resistors 30, 31 and 32T and capacitor 32C. When a trigger pulse is received at the gate of SCR 26, it is turned "on" establishing a zero-resistance path to ground for the charge accumulated on capacitor 33. As SCR 26 conducts, an electrical path is created between unijunction transistor 29 of the relaxation oscillator circuit and to ground for the Charge begins to accumulate on capacitor 32C at a rate determined by the ratio of the impedances of resistor 32T to capacitor 32C. When the accumulated charge unit on capacitor 32C approaches the breakdown potential of unijunction transistor 29, capacitor 32C discharges through the emitter of the unijunction transistor. A coupling capacitor 34 feeds the discharge pulse to the gate of SCR 27, causing the rectifier to conduct and create a zero-resistance path for the charge accumulated on the right side of capacitor 33. After the charge accumulated on capacitor 33 has discharged via SCR 26, SCR 27 shuts "off" because of the presence of a serially disposed resistor 35. To elaborate, because of the potential drop across resistor 35, there is an insufficient current available for SCR 27 to maintain conduction after the charge accumulated on capacitor 33 has been dissipated. As SCR 27 begins to conduct, an opposing current is impressed across SCR 26 and turns it "off." When SCR 26 stops conducting, relaxation oscillator including unijunction transistor 29 is disconnected from ground and it is prevented from reactuating SCR 27. Another trigger pulse must be received by counter pulse generating circuit 25 from sensor circuit 22 before the aforedescribed process can be repeated. Each time this process is repeated, a counter pulse is fed to the four-digit counter 40 and a reset pulse is coupled to integrator circuit 14 to clear capacitor 17 for a subsequent integration.

Figure 2:
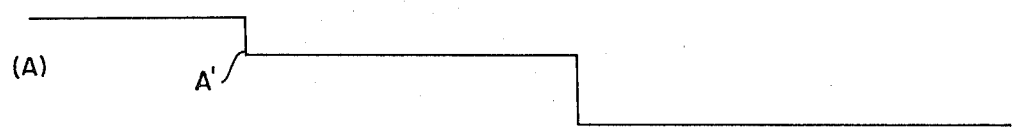
FIG. 2 depicts various wave forms at points throughout the invention.
Figure 2:
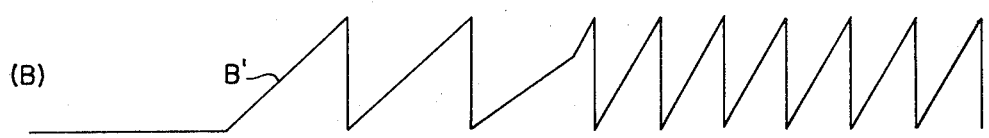
Figure 2:
Figure 2:
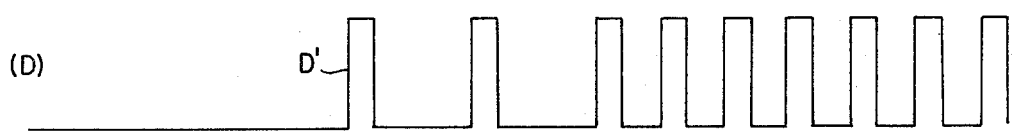

The pulse repetition rate of the amp-hour meter is directly dependent upon the proportional potential appearing across shunt resistor 13. Looking to FIG. 2 a representative example of the proportional potential appearing across shunt resistor 13 is waveform A. Up to point A', a zero proportional signal appearing across the shunt resistor indicates no load current flow and there is no integration and no output from integrator circuit 14, sensing circuit 22, or counter pulse generating circuit 25, see waveforms B, C and D. However, when a slightly negative proportional signal appears across the shunt resistor at point A', a signal is created in integrator circuit 14 having the shape shown at B'. When the signal stored on capacitor 17 reaches a maximum allowable voltage governed by the breakdown potential of unijunction transistor 23, a trigger signal, refer to wave form C', is coupled from sensing circuit 22 to counter pulse generating circuit 25. The counter pulse begins at point D' when the trigger pulse is received and has a duration governed by the time constant established by the resistor 32T and capacitor 32C. As the proportional signal appearing across shunt resistor 13 becomes more negative indicating a greater load current, the integration rate of integrator circuit 14 increases proportionally resulting in a correspondingly increased trigger pulse rate. The increased trigger pulse rate generates corresponding counter pulses and the amount of power consumed is visually indicated on the four-digit counter.

If it is known that a certain bank of storage batteries has a potential which is exhausted when the digital counter indicates one thousand, for example, the crew on a submersible is apprised of the work capabilities of the submersible. In addition to aiding in the successful completion of a task the invention reduces the hazards of deep submergence operations by giving an indication of the power-in-reserve to permit a trouble-free resurfacing.

Obviously, many modifications and variations of the present invention are possible in the light of the above teachings, and, it is therefore understood that within the scope of the disclosed inventive concept, the invention may be practiced otherwise than specifically described.

What is claimed is:

1. An apparatus for indicating the power drawn by a submersible from its on-board batteries comprising:
   a calibrated shunt resistor providing a signal proportional to the current flowing from said batteries;
   an integrator circuit including an operational amplifier, feedback capacitor, a variable resistor, and reset relay coupled to the shunt resistor for integrating the proportional signal at a variable rate proportional to its magnitude;
   an actuator circuit having biasing batteries and a relay connected to the operational amplifier, said relay being coupled to interconnect said biasing batteries to said operational amplifier for actuating the integrator circuit only when said current is flowing:
   a sensing circuit including a unijunction transistor connected to the operational amplifier for responding to the integrated proportional signal to provide a trigger pulse each time the integrated proportional signal reaches a predetermined level;
   a counter pulse generating circuit having a pair of SCRs and a unijunction transistor connected to the sensing circuit for receiving said trigger pulse to generate a counter pulse each time said trigger pulse is received;
   leads coupled to the counter pulse generating circuit for resetting the reset relay and operational amplifier of the integrator circuit to zero each time a counter pulse is received; and
   a four-digit counter coupled to the counter pulse generating circuit for providing a visual read-out of the accumulated counter pulses and power consumed by said submersible.

* * * * *